United States Patent
Liao et al.

(10) Patent No.: US 9,401,574 B2
(45) Date of Patent: Jul. 26, 2016

(54) INFORMATION HANDLING SYSTEM MULTI-AXIS POWER ADAPTER

(71) Applicant: Dell Products L.P., Round Rock, TX (US)

(72) Inventors: Tsung-Cheng Liao, Taipei (TW); Wen-Yung Chang, Jhong Li (TW); Justin C. Lyles, San Diego, CA (US); James Yao, Taoyuan (TW)

(73) Assignee: DELL PRODUCTS L.P., Round Rock, TX (US)

( * ) Notice: Subject to any disclaimer, the term of this patent is extended or adjusted under 35 U.S.C. 154(b) by 11 days.

(21) Appl. No.: 14/467,596

(22) Filed: Aug. 25, 2014

(65) Prior Publication Data

US 2016/0056600 A1  Feb. 25, 2016

(51) Int. Cl.
| | |
|---|---|
| *H01R 35/04* | (2006.01) |
| *H01R 13/44* | (2006.01) |
| *H01R 35/00* | (2006.01) |
| *H01R 31/06* | (2006.01) |
| *H02J 7/00* | (2006.01) |
| *H01R 43/26* | (2006.01) |
| *H01R 103/00* | (2006.01) |
| *H01R 13/66* | (2006.01) |

(52) U.S. Cl.
CPC .............. *H01R 35/04* (2013.01); *H01R 31/06* (2013.01); *H02J 7/00* (2013.01); *H01R 13/44* (2013.01); *H01R 13/6675* (2013.01); *H01R 43/26* (2013.01); *H01R 2103/00* (2013.01)

(58) Field of Classification Search
CPC ........ H01R 35/04; H01R 13/44; H01R 43/26; H01R 31/06; H01R 2103/00; H01R 13/6675; H02J 7/00
USPC ............. 439/131, 170, 171, 173, 174, 11, 31, 439/164, 165, 52, 151, 640, 221, 218, 10, 439/104
See application file for complete search history.

(56) References Cited

U.S. PATENT DOCUMENTS

| | | | |
|---|---|---|---|
| 6,840,784 B2 * | 1/2005 | Chang | H01R 35/04 439/131 |
| 8,672,693 B2 * | 3/2014 | Liu | H01R 13/44 439/131 |
| 2014/0235079 A1 * | 8/2014 | Wallace | H01R 35/04 439/131 |

* cited by examiner

*Primary Examiner* — Felix O Figueroa
*Assistant Examiner* — Paul Baillargeon
(74) *Attorney, Agent, or Firm* — Terrile, Cannatti, Chambers & Holland, LLP; Robert W. Holland

(57) ABSTRACT

An information handling system power adapter removably couples with a multi-axis plug that rotates between storage, wall socket and power strip positions. The storage position rotates prongs that insert into a power socket so the prongs are retracted into the power adapter, rotates prongs to plug into a wall socket so that the power adapter aligns parallel to the wall having the wall socket, and rotates the prongs to plug into a power strip socket so that the power adapter aligns perpendicular to the power strip having the socket. The multi-axis plug inserts into a power cable receptacle of the power adapter so that an end user may selectively remove the multi-axis plug and insert a power cable that terminates at a plug to connect the power adapter with a power socket through the power cable.

20 Claims, 9 Drawing Sheets

INFORMATION HANDLING SYSTEM MULTI-AXIS POWER ADAPTER

BACKGROUND OF THE INVENTION

1. Field of the Invention

The present invention relates in general to the field of information handling system power adapters, and more particularly to an information handling system multi-axis power adapter.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically operate on direct current (DC) power. Desktop, server and other "stationary" information handling systems typically have an integrated power adapter that adapts alternating current (AC) power received from a power plug put into a wall socket into DC power. Portable information handling systems do not typically integrate a power adapter, but rather tend to use external "brick" power adapters. Generally, portable information handling systems are designed to run free of cables and wires, such as power wires and plugs that accept power from a wall socket. Thus, portable information handling systems typically integrate rechargeable batteries that provide power during normal operations. When the charge is low, an end user plugs an external power adapter into a wall socket and the external power adapter converts AC power into DC power that recharges the battery and runs the portable information handling system. The external power adapter plugs into a power port of the portable information handling system so that an end user may remove the power adapter when operating on the system battery. Using an external brick power adapter instead of an integrated power adapter reduces the system size to provide improved mobility when operating off battery power.

One difficulty with the use of external power adapters is that power lines are generally needed to connect the power adapter to the information handling system and the wall socket. Power lines are often inconvenient to store and awkward to use. A power adapter accessory known as a "duck head" provides end users with greater convenience by attaching a wall socket plug to power adapter so that a cable is not needed between the power adapter and the wall socket. In some instances the duck head is integrated in the power brick and rotates as wall socket plug between retracted and extended positions so that the brick consumes less space when not in use by retracting the plug. In some instances, the duck head couples and decouples from the brick so that an end user can use a power cable instead of the duck head, thus providing a greater total length of cable between the wall socket and portable information handling system.

Although a duck head adapter provides convenience to end users of portable information handling systems by removing a cable between the adapter and power socket, the extension of the power plug from a position close to the power adapter does introduce difficulty in some situations. For example, the body of the power adapter sometimes interferes with objects near a wall socket when the plug extends from the duck head adapter. If an end user wants to plug a power adapter duck head into a power strip, the power adapter often covers other sockets so that the end user cannot use all of the sockets of the power strip. Generally, if the duck head adapter plug will not fit into the power socket, the user must find another socket or attach a power cable that provides distance between the power adapter and the wall socket.

SUMMARY OF THE INVENTION

Therefore a need has arisen for a system and method which provides multiple axes relative to a power adapter for connecting a plug to a power socket.

In accordance with the present invention, a system and method are provided which substantially reduce the disadvantages and problems associated with previous methods and systems for connecting a plug integrated in a power adapter with a power socket. Prongs that insert into a power receptacle rotate from a storage position to at least first and second power positions along first and second axes relative to the orientation of the power adapter. A user may connect the power adapter to power receptacles with the power adapter having at least first and second orientations relative to the power receptacle so that objects near the power receptacle do not interfere with insertion of the prongs due to the size of the adapter.

More specifically, a power adapter converts alternating current into direct current for use by an information handling system. The power adapter accepts a multi-axis plug having prongs to insert into a power receptacle. The prongs move between a storage position in which the prongs retract into the power adapter, a wall socket position in which the prongs extend perpendicular to the length of the power adapter, and a power strip position in which the prongs extend perpendicular to the length of the power adapter. In one embodiment, the prongs are rotated between positions with an alignment adapter disposed in the multi-axis plug. An inner housing contains prongs that are rotationally supported by a prong support in cradle of a base. The base rotates relative to the multi-axis plug to move the prongs between the storage and wall socket positions. The prong support rotates in the base cradle to move the prongs between the wall socket and power strip positions. Prong contacts on the side and end of the prongs contact wire connectors that interface with the adapter when the prong rotate into the wall socket and wall strip positions.

The present invention provides a number of important technical advantages. One example of an important technical advantage is that a power adapter connects an integrated plug into a socket along multiple axes to aid an end user in obtaining a power connection with different types of power sockets. For example, a plug rotates to a perpendicular orientation relative to the length of a power adapter so that the length rests next to a wall when the plug connects into a wall socket. The plug also rotates to a parallel orientation relative to the length so that the plug extends from one end to have the power adapter length extend outwards from the socket. The parallel orientation provides a convenient connection to a power strip that keeps the adapter from covering other sockets of the power strip. When not in use, the plug rotates into the power adapter to allow more convenient storage of the power adapter.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A multi-axis power adapter plugs into power receptacles with different orientations to provide external power to an information handling system in situations where power receptacles are awkward to use, such as wall sockets blocked by furniture or power strips having multiple plugs inserted into multiple receptacles. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
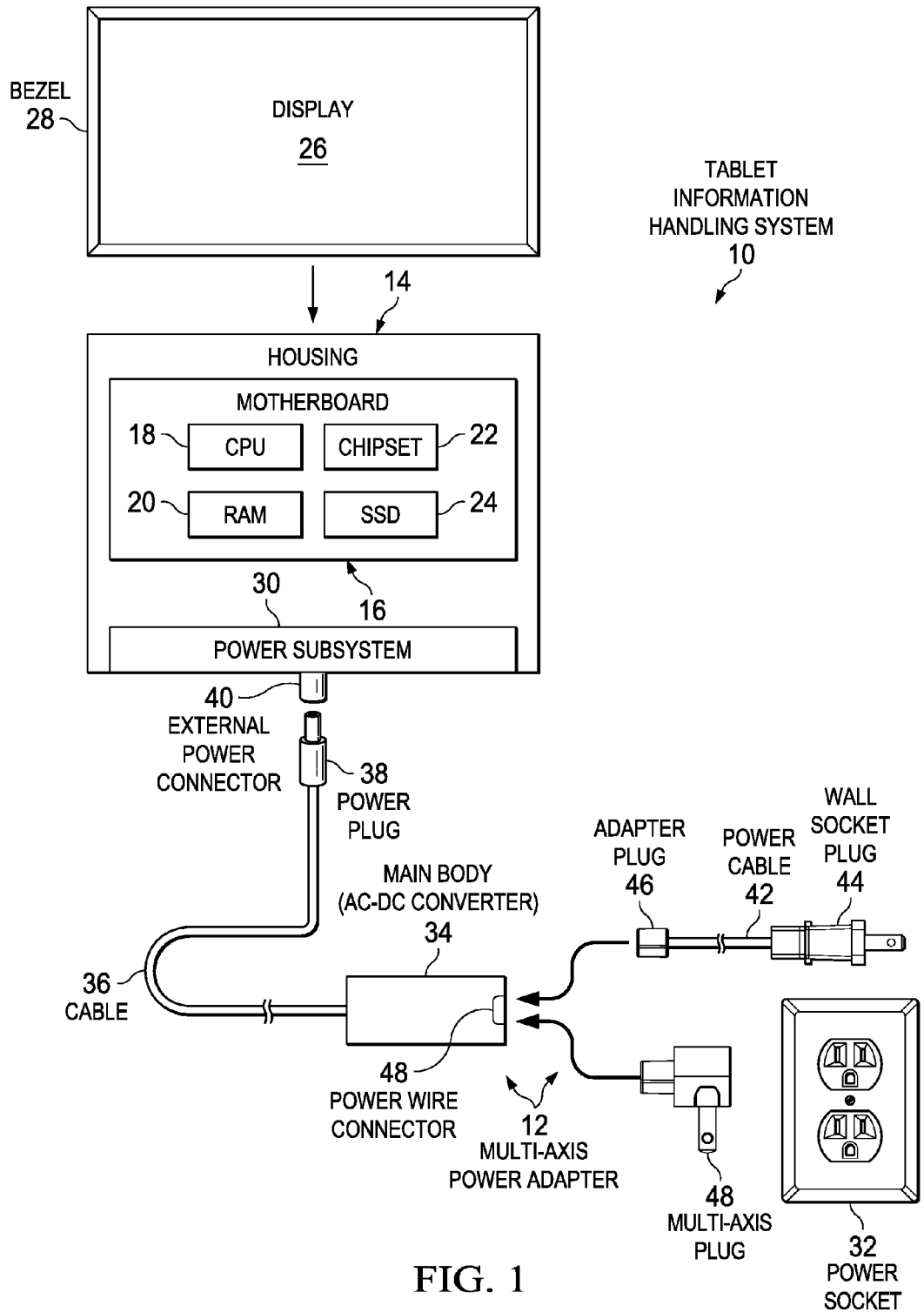
FIG. 1 depicts a block diagram of a tablet information handling system having a multi-axis power adapter.

Referring now to FIG. 1, a block diagram depicts a tablet information handling system 10 having a multi-axis power adapter 12. Tablet information handling system 10 processes information with processing components disposed in a housing 14. For example, a motherboard 16 supported in housing 14 interfaces a central processing unit (CPU) 18 and random access memory (RAM) 20 so that CPU 18 runs instructions stored in RAM 20 to process information stored in RAM 20. A chipset 22 coordinates interactions between CPU 18, RAM 20 and I/O devices, such as a keyboard or touchscreen. A solid state drive (SSD) 24 stores information in persistent memory for access after the system powers down. A display 26 couples over housing 14, such as with a bezel 28, to cover and protect the processing components. Display 26 interfaces with a graphics processor of chipset 22 to present information processed by CPU 18 as visual images. A power subsystem 30 provides power to run the processing components. For example, power subsystem 30 provides power from an integrated battery when external power is not available and charges the battery when external power is available to run the processing components. Although tablet information handling system 10 is depicted having a planar housing 14, in other embodiments other types of information handling systems may be supported by the multi-axis power adapter 12, such as laptop, convertible, smartphone, desktop and other types of portable and non-portable information handling systems.

In order to provide power to power subsystem 30 for running the processing components and charging the battery, multi-axis power adapter 12 accepts AC power from a power socket 32 and converts the power to DC power for use by power subsystem 30. A main body portion 34 of adapter 12 includes AC-to-DC power conversion circuitry that provides DC power through a cable 36 to a power plug 38 that fits into an external power connector 40 of information handling system 10. Main body 34 accepts AC power from a removable power cable 44 that terminates at a wall socket plug 44 and fits an adapter plug 46 into a power wire connector 48 or from a multi-axis plug 48. Power cable 42 provides additional length of cable for the end user so the end user can have greater freedom of movement relative to power socket 32, however, power cable 42 is inconvenient to carry when traveling. Instead, an end user may plug multi-axis plug 48 into power adapter main body 34 so that power adapter 12 plugs directly into a power socket 32 instead of using power cable 42.

Figure 2A:
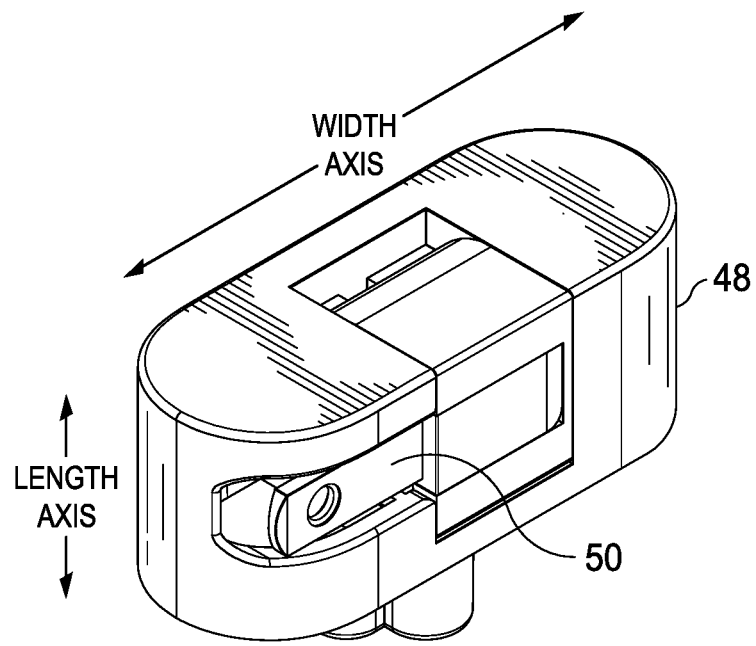
FIGS. 2A-D depict the multi-axis power adapter in a storage and various extended positions.
Figure 2B:
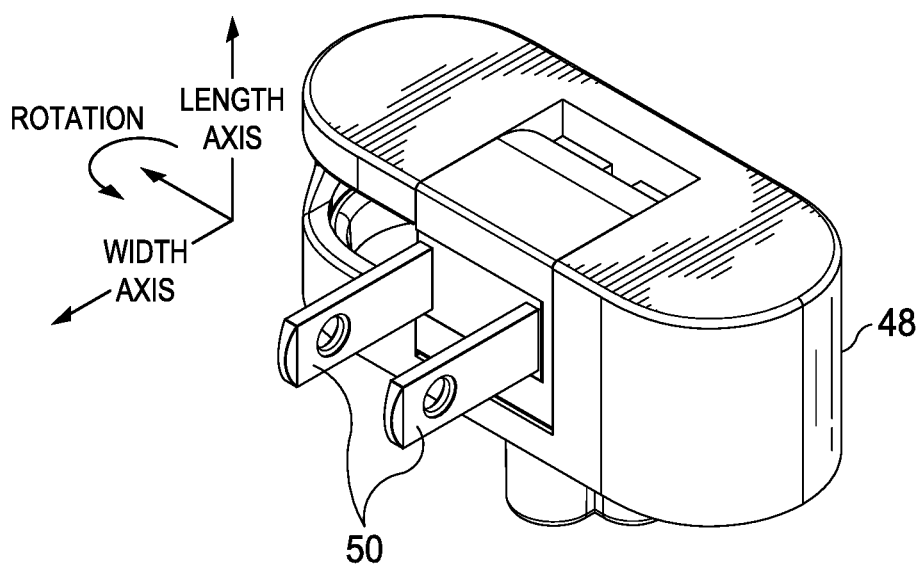
Figure 2C:
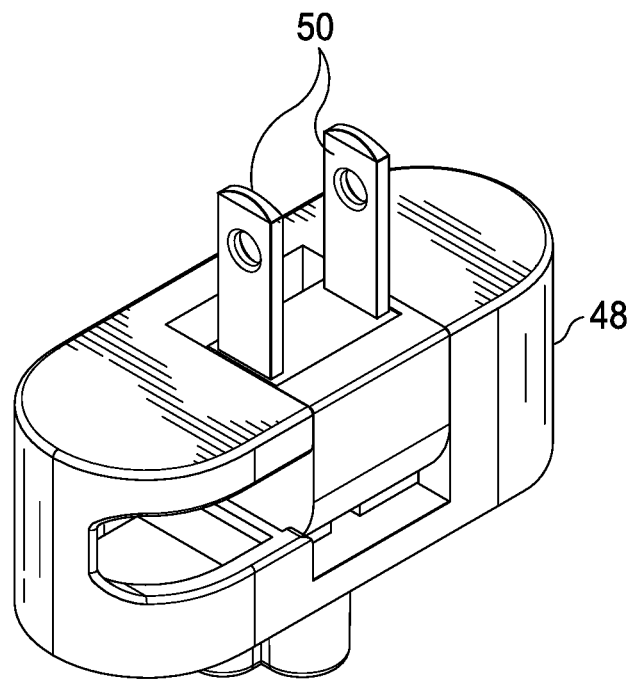
Figure 2D:
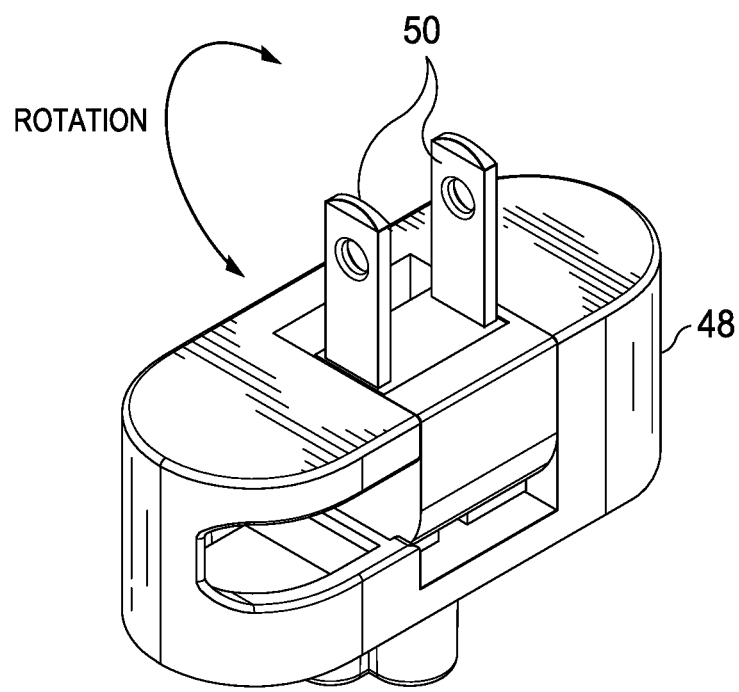

Referring now to FIGS. 2A-D, the multi-axis power adapter plug 48 is depicted in a storage and various extended positions. In FIG. 2A, prongs 50 that insert into a power socket 32 are stored within an outer housing 52 so as to be out of the way when not connected to external power. In FIG. 2B, prongs 50 rotate 90 degrees to a wall socket position that extends outward along an axis perpendicular to the length of power adapter 12. The axis of extension allows the adapter main body to come proximate a wall surface when prongs 50 engage a power socket 32. In FIG. 3B, prongs 50 rotate an additional 90 degrees to a power strip position that aligns with an axis parallel the length and perpendicular the width of the main body 34 of adapter 12. The axis of extension allows the adapter main body 34 to extend outward from a power socket 32 so that adjacent power sockets are not covered by the main body, such as might happen when coupled to a power strip. In FIG. 2D, the power prongs 50 rotation about the axis of extension to change the orientation of the adapter 12 relative to the power socket when prongs 50 are plugged into a power socket. Rotating about the axis of orientation allows an end user with greater flexibility to obtain power when the power sockets are in difficult to reach locations.

Figure 3:
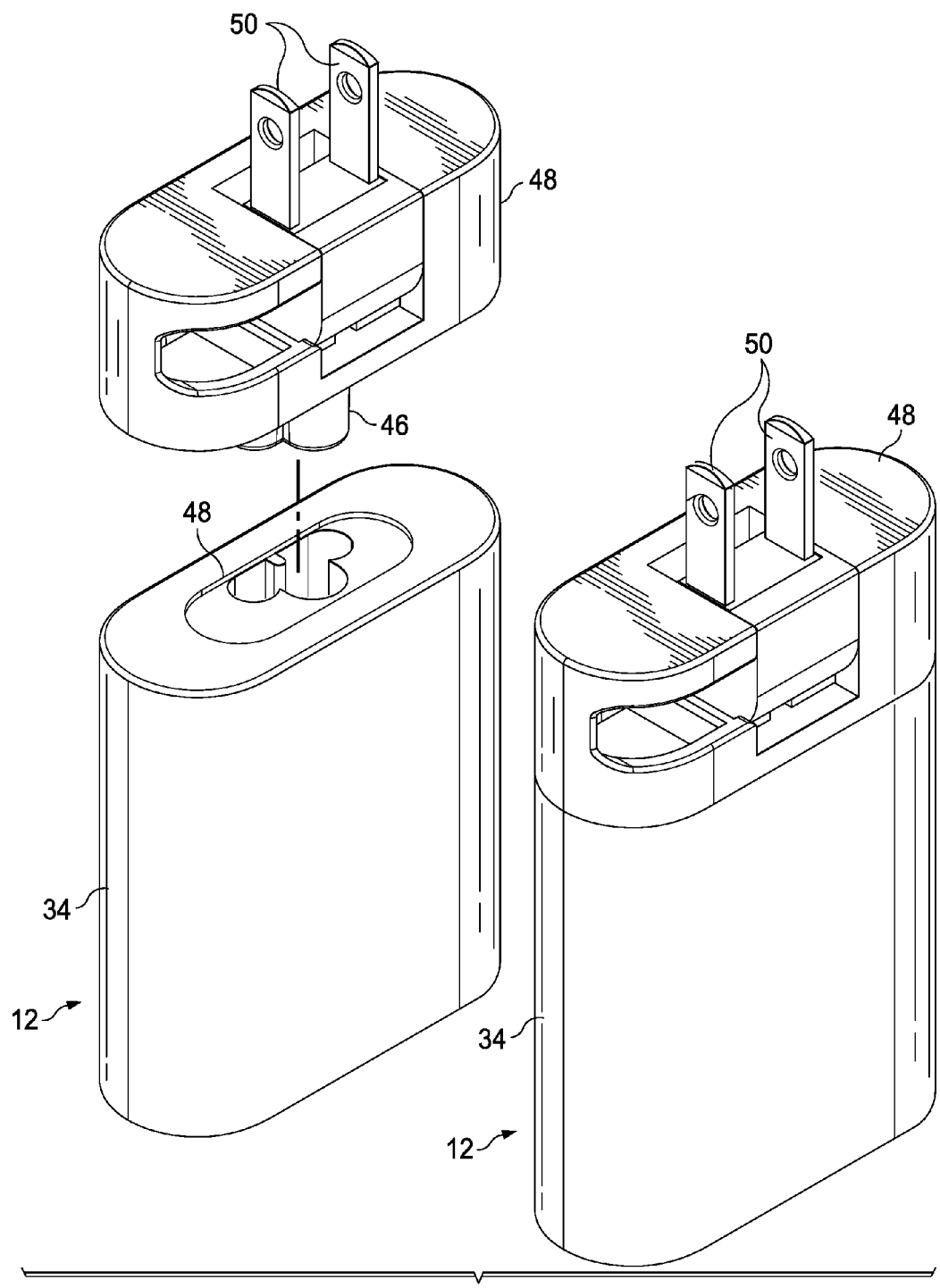
FIG. 3 depicts the multi-axis power adapter with a multi-axis plug selectively coupled and decoupled from the power adapter main body.

Referring now to FIG. 3, the multi-axis power adapter 12 is depicted with a multi-axis plug 48 selectively coupled and decoupled from the power adapter main body 34. An end user may selectively attach and detach multi-axis plug 48 based on the user's intended use. For example, if the user is traveling and needs compact storage, multi-axis plug provides a convenient traveling footprint. If the user needs to have additional room to move around while connected with external power, then the user may plug a cable into power wire connector 48 in the place of multi-axis plug 48. Multi-axis plug 48 has an adapter plug 46 adapted to fit into the same power wire connector 48 as a power cable so that an end user may use multi-axis plug 48 and a power cable interchangeably to connect main body 34 to external power.

Figure 4:
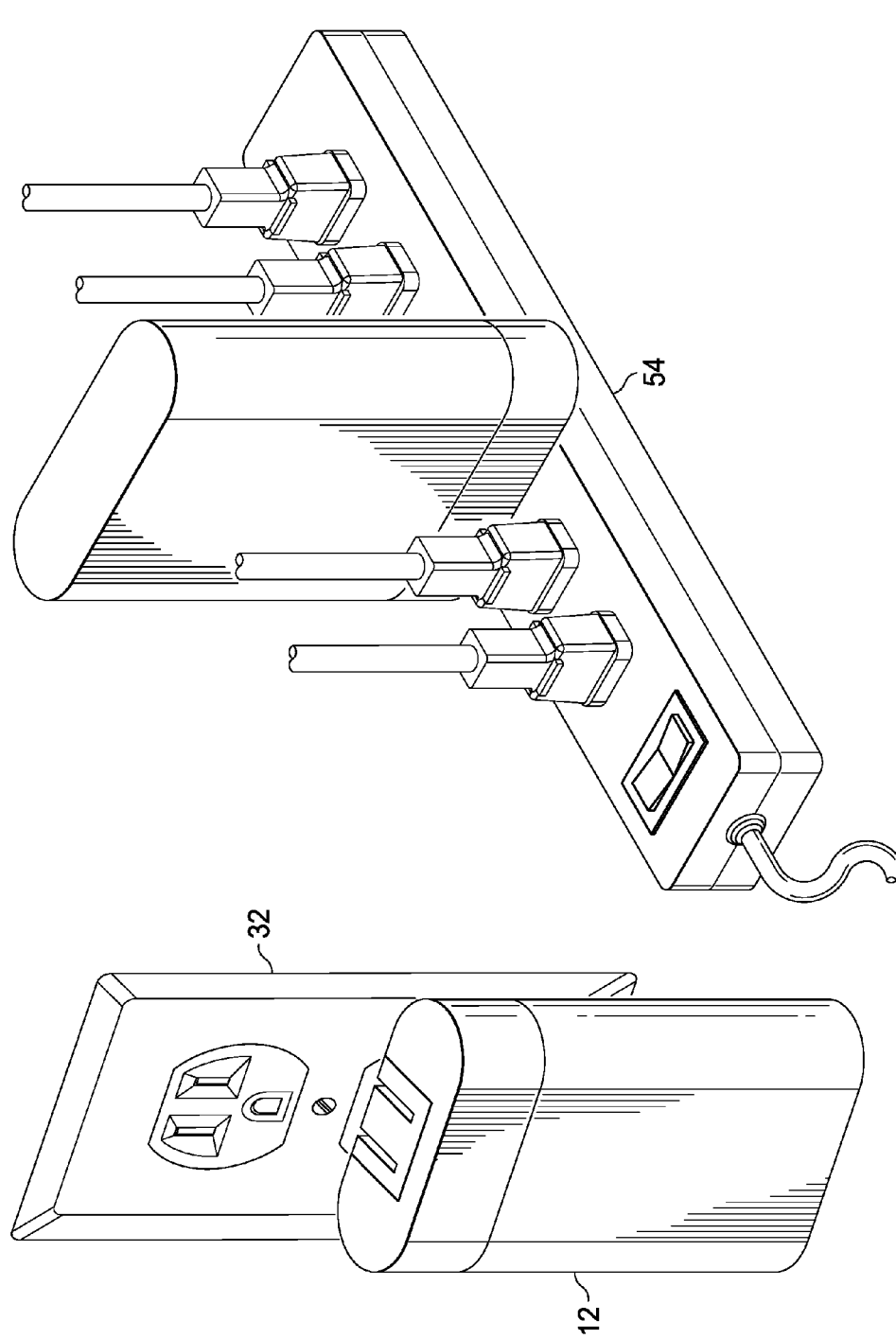
FIG. 4 depicts the multi-axis power adapter coupled to a wall socket in the wall socket position and a power strip in the power strip position.

Referring now to FIG. 4, the multi-axis power adapter is depicted coupled to a wall socket 32 in the wall socket position and a power strip 54 in the power strip position. In the wall socket position, power adapter 12 hugs the wall surface to take up less room and stay out of the way of people or furniture located near the wall socket. In the power strip position, power adapter 12 extends upward vertically so that the main body portion does not block power receptacles located in the power strip. If a user needs more flexibility in positioning power adapter 12, the user may rotate about the prong insertion axis or connect a power cable instead of the multi-axis plug.

Figure 5:
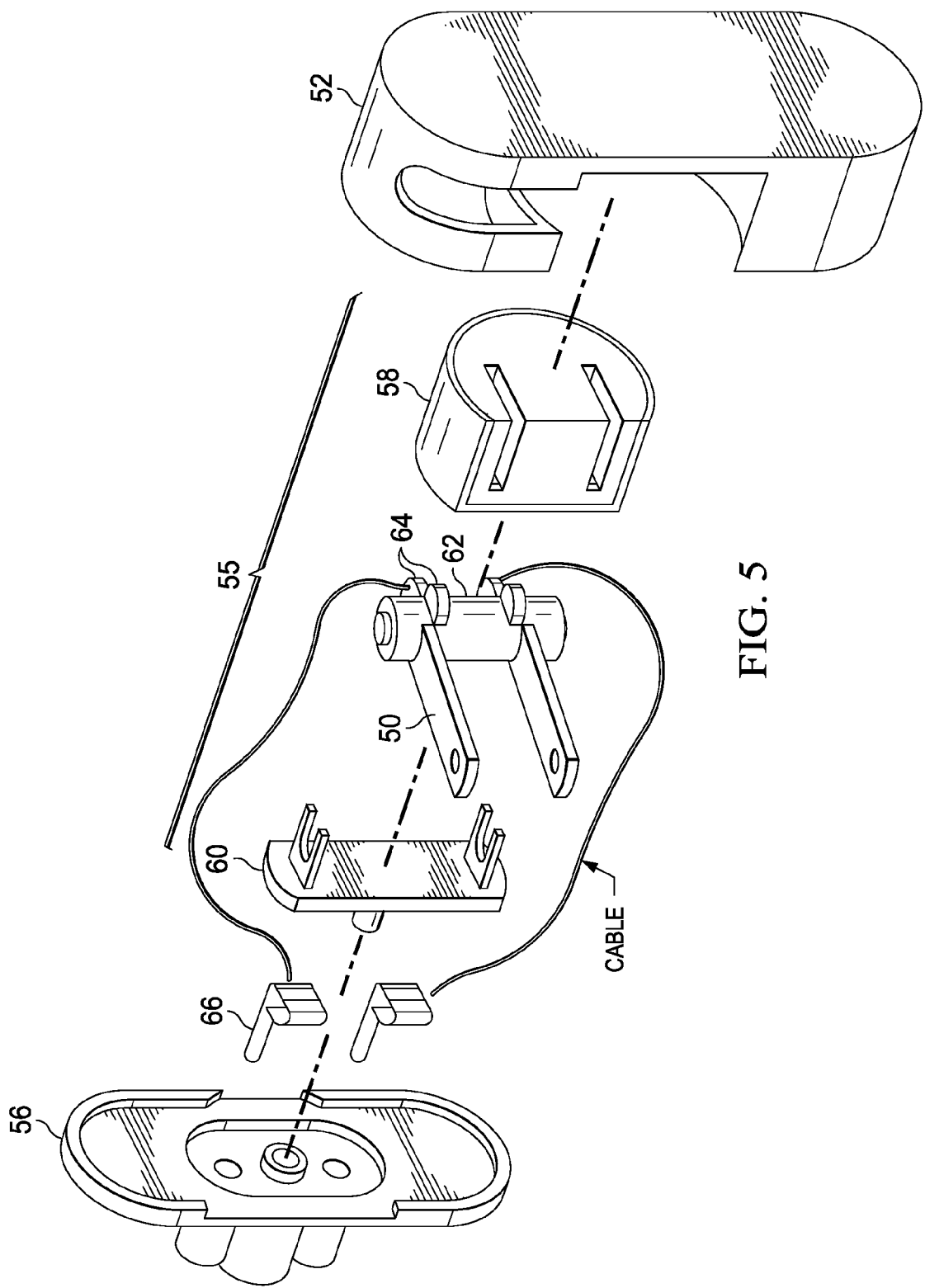
FIG. 5 depicts a blow-up perspective view of a power adapter multi-axis plug that provides power from an external power socket in first and second extended positions.

Referring now to FIG. 5, a blow-up perspective view depicts a power adapter multi-axis plug 48 that provides power from an external power socket in first and second extended positions. An alignment adapter 55 provides rotation of prongs 50 between multiple axes and is captured between an outer housing 52 and an outer housing plug adapter 56. The alignment adapter has an inner housing 58 that rotationally fits within outer housing 52 and a base 60 that rotationally pivots about a pin inserted in outer housing plug adapter 56. Prongs 50 are held in parallel alignment by a prong support 62 that rotationally couples with a cradle formed in base 60. Each prong 50 has a pair of prong contacts 64 that extend outward and are in electrical communication with its prong material. Prong contacts 64 align with wire connectors 66 inserted in outer housing plug adapter 56 for electrical communication when contact is made.

During normal use, prong contacts 64 transfer power received by the insertion of prongs 50 into an electrical socket to wire connectors 66 for communication to the adapter main body. In the storage position, prongs 50 extend from inner housing 58, and inner housing 58 rotates the extended prongs 50 into outer housing 52 out of sight from the user. In the storage position, prong contacts 64 do not contact wire connectors 66. In the wall socket position, prongs 50 extend outward from inner housing 58 as depicted so that a first set of the prong contacts 64 along the sides of prongs 50 contact wire connectors 66. A user selects the power strip position by rotating prongs 50 90 degrees to extend outward from the top of outer housing 52. In the power strip position, power transfers between wire connectors 66 and the second set of prong contacts 64 located at the ends of prongs 50 contact wire connectors 66. Although the depicted inner housing 58 prevents rotation about the axis at which prongs 50 extend when in the wall socket position, in an alternative embodiment, inner housing 58 may be shaped to allow such rotation with power transferred between wire connectors 66 and prongs 50 by a wire connector.

Figure 6:
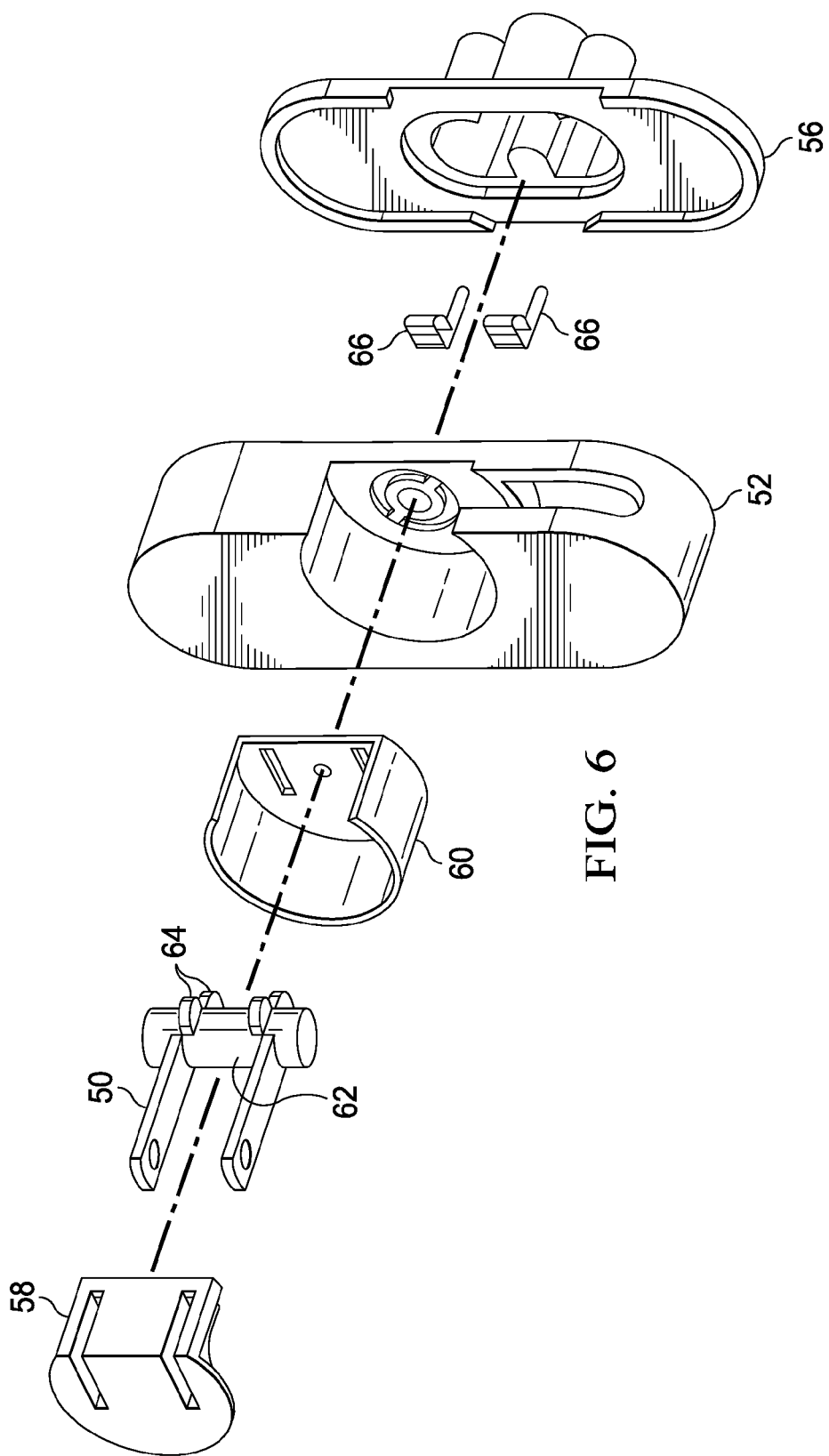
FIG. 6 depicts a blow-up perspective view of an alternative embodiment of the multi-axis plug.

Referring now to FIG. 6, a blow-up perspective view depicts an alternative embodiment of the multi-axis plug 48. Inner housing 58 and base 60 assemble around prongs 50, and the assembly then inserts into an opening formed in outer housing 52. Prong connectors 64 extend through an opening of outer housing 52 to contact wire connectors 66 disposed in outer housing plug adapter 56. In the example embodiment, rotation about the axis of extension in the power strip position is supported by providing contact between contacts 64 and wire connectors 66 through a curved opening formed in outer housing 52. This provides an end user with greater flexibility in positioning adapter 12 on a power strip that may be in an inconvenient position or may have plugs of varying shapes and sizes that interfere with the power adapter's positioning.

Figure 7:
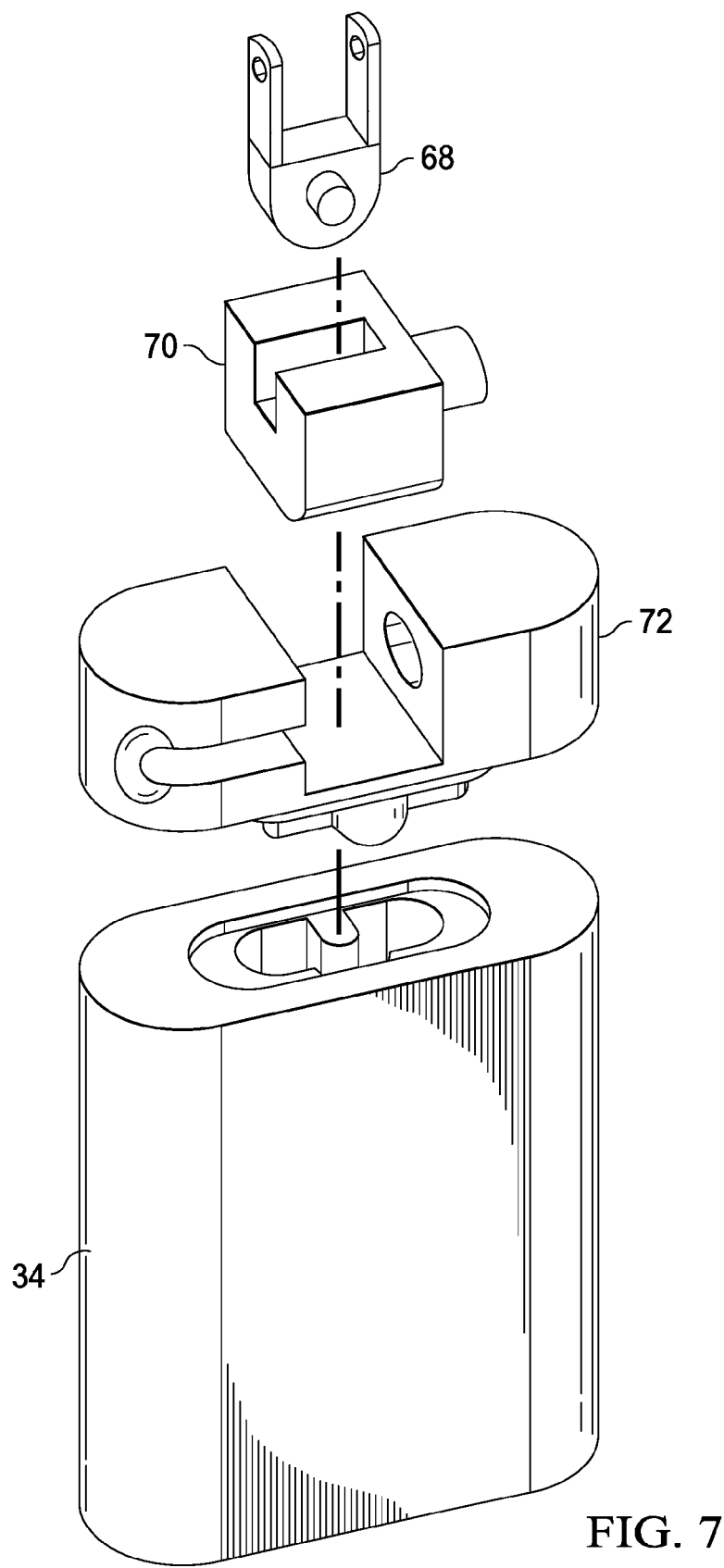
FIG. 7 depicts a blow-up perspective view of another alternative embodiment of the multi-axis power adapter plug.

Referring now to FIG. 7, a blow-up perspective view depicts another alternative embodiment of the multi-axis power adapter plug. A plug head 68 rotates about a pivot point formed in a plug holder 70. Plug holder 70 in turn rotates about a pivot point formed in a plug body 72, which fits into the adapter 12. Power is transferred from prongs 50 to wire strips at the pivot locations through spring clips that force an electrical contact. If desired, electrical communication is only supported at pivot point locations that align with the wall socket and power strip positions. Plug holder 70 and plug body 72 are shaped to guide prongs to the desired positions. In an alternative embodiment, plug head 68 might sit in an additional holding device that supports additional rotation about the axis of extension of prongs 50.

Figure 8:
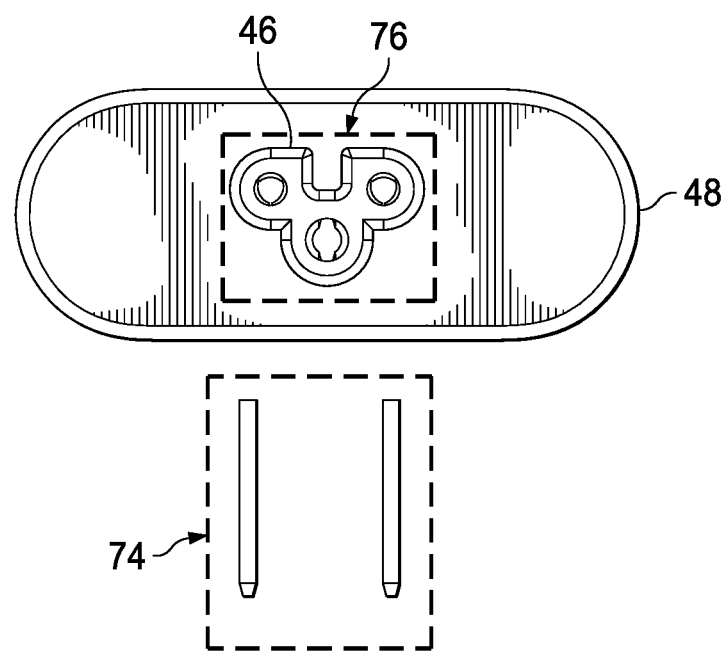
FIG. 8 depicts a front and side view of a multi-axis plug adapter having adjusted connector openings to maintain plug compatibility.

Referring now to FIG. 8, a front and side view depict a multi-axis adapter 48 having adjusted connector openings to maintain plug compatibility. An adapter plug 46 extending out from multi-axis adapter 48 has a perimeter shaped to insert into a power wire connector of the main power adapter body 34. Two pin prongs 74 are inserted into the adapter plug 46 to couple with two of three prongs of the main adapter body 34 when adapter plug 46 inserts into the main adapter body 34. A three pin plug 76 accepts the two pin prongs 74 to align with the main power connectors of main body 34, while the third middle connector area is unpopulated with a ground pin. The perimeter of adapter plug 46 is altered from a standard C5 plug type to square inner corners between two pin prongs 74 so that multi-axis adapter 48 will not fit on power adapters that are not configured to accept the non-standard plug.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processing components disposed in the housing and operable to process information;
   a display integrated with the housing and interfaced with the processing components to present the information as visual images;
   a power subsystem having an external power connector and operable to provide power to the processing components and the display;
   a power adapter having a body with a length and a width and having a cable extending from the body, the cable terminating at a power plug configured to fit into the external power connector; and
   a multi-axis plug coupled to the power adapter body and having an outer housing and an inner housing, the inner housing having first and second prongs adapted to connect with a wall socket, the multi-axis plug operable to rotate between a storage position, a wall socket position and a power strip position
   wherein:
   the storage position has the prongs withdrawn into the outer housing and oriented along a first axis;

the wall socket position has the prongs extended from the outer housing and oriented in a second axis rotated ninety degrees from the first axis about a third axis, the third axis perpendicular to the first and second axes; and the power strip position has the prongs extended from the outer housing and oriented along the third axis, the prongs rotating ninety degrees from the second axis to the third axis about the first axis.

2. The system of claim 1 wherein the multi-axis plug is further operable to rotate about the second axis when in the wall socket position.

3. The system of claim 1 wherein the multi-axis plug is further operable to rotate about the third axis when in the power strip position.

4. The system of claim 1 wherein the multi-axis plug removably couples to a power wire connector of the body, the power wire connector accepting a power wire at one end terminating at another end in a plug adapted to connect to a wall socket.

5. The system of claim 4 wherein the multi-axis plug further comprises:
an outer housing;
first and second prongs disposed in the housing and coupled together by a prong support that holds the first and second prongs in alignment to fit in a wall socket; and
an alignment adapter rotationally coupling the first and second prongs in the housing to move between the storage, wall socket and power strip positions.

6. The system of claim 5 wherein the alignment adapter comprises:
an inner housing having first and second slots adapted to allow ninety degrees of rotation of the first and second prongs;
a base having a cradle to rotationally couple to the prong support to support the ninety degrees of rotation;
first and second wire connectors disposed proximate the base to communicate electrical power from the inner housing to the body; and
first and second contacts extending from each of the first and second prongs and aligned to contact the first and second wire connectors at each extreme of the ninety degrees of rotation.

7. The system of claim 6 further comprising an electrical conductor interfacing the first and second prongs with the first and second wire connectors during rotation of the base relative to the housing.

8. The system of claim 1 wherein the body includes circuitry to transform alternating current to direct current.

9. A method for connecting a power adapter to a socket in plural orientations, the method comprising:
rotating first and second prongs ninety degrees about a first rotation axis from a retracted position within the power adapter to a first extended position outside the power adapter and aligned with a first extended axis, the first extended position aligned to couple with a power socket in a first orientation;
at the first extended position, connecting the first and second prongs to first and second wire connectors with a first connector extension on each of the first and second prongs;
rotating the first and second prongs ninety degrees about a second rotation axis from the first extended position to a second extended position outside the power adapter and aligned with a second extended axis, the second extended position aligned to couple with a power socket in a second orientation, the second extended axis parallel to the first rotation axis; and
at the second extended position, connecting the first and second prongs to the first and second wire connectors with a second connector extension on each of the first and second prongs.

10. The method of claim 9 further comprising:
rotating the first and second prongs about the first extended axis; and
maintaining electrical communication between the first and second prongs and the first and second wire connectors with a cable disposed between each of the first prong and wire connector and the second prong and wire connector.

11. The method of claim 9 further comprising:
rotating the first and second prongs about the second extended axis; and
maintaining electrical communication between the first and second prongs and the first and second wire connectors with a cable disposed between each of the first prong and wire connector and the second prong and wire connector.

12. The method of claim 9 further comprising:
removing a portion of the adapter having the first and second prongs from a portion of the adapter having power transformation circuitry to transform alternating current to direct current; and
coupling a power cable to the portion of the adapter having power transformation circuitry, the power cable terminating at a plug.

13. A power adapter comprising:
power transformation circuitry operable to convert AC power to DC power;
a cable extending from the power transformation circuitry to a power plug adapted to couple to an information handling system external power connector; and
a multi-axis plug interfaced with the power transformation circuit and adapted to connect with a wall socket, the multi-axis plug having at least first and second prongs, the first and second prongs operable to rotate between a storage position having the first and second prongs contained within the multi-axis plug, a wall socket position having the prongs extending outward from the body on a first axis, and a power strip position having the prongs extending outward from the body on a second axis, the prongs rotating between the storage position, the wall socket position and the power strip position about at least two different axes that are perpendicular to each other.

14. The power adapter of claim 13 wherein the multi-axis plug is further operable to rotate about the first axis when extended in the wall socket position.

15. The power adapter of claim 13 wherein the multi-axis plug is further operable to rotate about the second axis when extended in the power strip position.

16. The power adapter of claim 13 further comprising:
a housing having a first portion removable from a second portion, the first portion containing the power transformation circuitry and the second portion containing the multi-axis plug; and
a power wire connector disposed in the first portion and operable to accept a power wire adapted at one end to couple to the first housing portion and terminating at a second end in a plug, the plug configured to insert into a wall socket to communicate power to the power transformation circuitry;

wherein housing second portion is adapted to couple to the housing first portion in the place of the power wire connector.

17. The power adapter of claim 16 wherein the multi-axis plug further comprises:
   first and second prongs disposed in the housing and coupled together by a prong support that holds the first and second prongs in alignment to fit in a wall socket; and
   an alignment adapter rotationally coupling the first and second prongs in the second housing portion to move between the storage, wall socket and power strip positions.

18. The power adapter of claim 17 wherein the alignment adapter comprises:
   an inner housing having first and second slots;
   a base having a cradle to rotationally couple to the prong support, the base rotating relative to the housing first and second portions;
   first and second wire connectors disposed proximate the base to communicate electrical power from the first and second prongs to the power wire connector; and
   first and second contacts extending from each of the first and second prongs and aligned to contact the first and second wire connectors when the prongs rotate to first and second positions at the first and second slots and the base.

19. The power adapter of claim 18 wherein the prong first and second positions comprise the wall socket position and the power strip position.

20. The power adapter of claim 18 further comprising an electrical conductor interfacing the first and second prongs with the first and second wire connectors during rotation of the base relative to the first and second housing portions.

* * * * *